United States Patent
Paul

(10) Patent No.: US 11,012,403 B1
(45) Date of Patent: May 18, 2021

(54) STORYLINES: COLLABORATIVE FEEDBACK SYSTEM

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 56 days.

(21) Appl. No.: 16/120,635

(22) Filed: Sep. 4, 2018

(51) Int. Cl.
 *H04L 12/58* (2006.01)

(52) U.S. Cl.
 CPC .............. *H04L 51/32* (2013.01); *H04L 51/10* (2013.01)

(58) Field of Classification Search
 CPC ......... H04L 51/00; H04L 51/04; H04L 51/06; H04L 51/063; H04L 51/08; H04L 51/10; H04L 51/12; H04L 51/16; H04L 51/32; H04L 65/00; H04L 65/40–4023; H04L 65/403
 See application file for complete search history.

(56) References Cited

U.S. PATENT DOCUMENTS

| | | | | |
|---|---|---|---|---|
| 8,140,983 B2 * | 3/2012 | Brantley | ............... | G06F 16/958 715/759 |
| 8,667,063 B2 * | 3/2014 | Graham | ................. | G06Q 50/01 709/204 |
| 8,732,590 B2 * | 5/2014 | Barker | ................. | G06Q 10/107 715/753 |
| 8,788,585 B2 * | 7/2014 | McBrearty | ......... | G06Q 30/0269 709/204 |
| 8,862,593 B1 * | 10/2014 | Zureiqat | ................ | G06Q 50/01 707/748 |
| 9,094,282 B2 * | 7/2015 | Richardson | ............ | G06Q 10/10 |
| 9,195,842 B2 * | 11/2015 | Zang | ........................ | H04L 51/12 |
| 9,262,596 B1 * | 2/2016 | Steiner | .................. | H04W 12/08 |
| 9,292,879 B1 * | 3/2016 | Lu | ........................... | G06Q 50/01 |
| 9,361,626 B2 * | 6/2016 | Garcia-Barrio | ........ | G06Q 50/01 |
| 9,367,609 B1 * | 6/2016 | Mianji | ................ | G06F 16/2428 |
| 9,374,374 B2 * | 6/2016 | Steinberg | ................ | H04L 63/10 |
| 9,391,944 B2 * | 7/2016 | Deeter | .................... | H04L 51/32 |
| 9,449,308 B2 * | 9/2016 | Schiff | ........................ | G06F 8/34 |
| 9,621,505 B1 * | 4/2017 | Ko | .......................... | H04L 51/32 |
| 10,242,477 B1 * | 3/2019 | Charlton | ................. | A63F 13/00 |

(Continued)

OTHER PUBLICATIONS

Andrus—7 Ways to Deal With AHole Facebook Fans—Mashable—Jan. 4, 2014 (Year: 2014).*

(Continued)

*Primary Examiner* — Boris D Grijalva Lobos
(74) *Attorney, Agent, or Firm* — FisherBroyles, LLP

(57) ABSTRACT

The disclosed computer-implemented method for sharing content and allowing users to react using storyline-based feedback may include receiving a first input identifying content is to be part of a story. The method may next include receiving a second input indicating that the story is available to receive storyline-based feedback. The storyline-based feedback may include ephemeral visual content related to the story. Users may join a conversation by adding such visual content. The method may further include posting the story for consumption by other specified users, receiving visual storyline-based feedback related to the posted story from different users, and updating the posted story with the received portions of storyline-based feedback in storyline form. Various other methods, systems, and computer-readable media are also disclosed.

20 Claims, 12 Drawing Sheets

(56) References Cited

U.S. PATENT DOCUMENTS

| | | | |
|---|---|---|---|
| 10,263,932 B2* | 4/2019 | Tene | H04L 51/16 |
| 10,334,053 B2* | 6/2019 | Clediere | H04L 67/141 |
| 10,382,373 B1* | 8/2019 | Yang | G06N 20/00 |
| 10,389,765 B2* | 8/2019 | Zeng | G06F 3/04847 |
| 10,684,738 B1* | 6/2020 | Sicora | G06F 3/04817 |
| 2006/0230061 A1* | 10/2006 | Sample | G06Q 50/01 |
| 2006/0248086 A1* | 11/2006 | Pahud | G06F 40/10 |
| 2009/0052645 A1* | 2/2009 | Bansal | H04M 7/0045 |
| | | | 379/202.01 |
| 2009/0228486 A1* | 9/2009 | Kuehr-McLaren | |
| | | | H04L 63/101 |
| 2010/0250675 A1* | 9/2010 | Lee | G06Q 10/10 |
| | | | 709/204 |
| 2011/0258561 A1* | 10/2011 | Ladouceur | G06Q 10/103 |
| | | | 715/753 |
| 2012/0130910 A1* | 5/2012 | Al-Alami | G06Q 30/016 |
| | | | 705/304 |
| 2012/0158720 A1* | 6/2012 | Luan | G06Q 50/01 |
| | | | 707/732 |
| 2012/0270563 A1* | 10/2012 | Sayed | H04L 63/083 |
| | | | 455/456.3 |
| 2013/0013683 A1* | 1/2013 | Elliott | G06Q 10/101 |
| | | | 709/204 |
| 2013/0044050 A1* | 2/2013 | Ylivainio | G06F 3/0481 |
| | | | 345/156 |
| 2013/0080348 A1* | 3/2013 | Pantaliano | G06Q 30/02 |
| | | | 705/347 |
| 2013/0110876 A1* | 5/2013 | Meijer | H04L 63/101 |
| | | | 707/783 |
| 2013/0159271 A1* | 6/2013 | Ophir | G06F 16/9535 |
| | | | 707/706 |
| 2013/0159887 A1* | 6/2013 | Whitmyer, Jr. | G06F 16/958 |
| | | | 715/760 |
| 2013/0173531 A1* | 7/2013 | Rinearson | G06F 16/93 |
| | | | 707/608 |
| 2013/0198275 A1* | 8/2013 | Forsblom | G06Q 50/01 |
| | | | 709/204 |
| 2013/0227016 A1* | 8/2013 | Risher | G06Q 10/10 |
| | | | 709/204 |
| 2013/0246474 A1* | 9/2013 | Victor | G06F 16/176 |
| | | | 707/785 |
| 2013/0262261 A1* | 10/2013 | Rozek | G06Q 50/01 |
| | | | 705/26.5 |
| 2013/0297691 A1* | 11/2013 | Collins | G06F 16/9535 |
| | | | 709/204 |
| 2013/0339868 A1* | 12/2013 | Sharpe | G06Q 10/10 |
| | | | 715/739 |
| 2014/0040712 A1* | 2/2014 | Chang | G06F 17/212 |
| | | | 715/202 |
| 2014/0282096 A1* | 9/2014 | Rubinstein | H04L 63/108 |
| | | | 715/753 |
| 2015/0052456 A1* | 2/2015 | Engelking | H04L 51/046 |
| | | | 715/753 |
| 2015/0106429 A1* | 4/2015 | Hegberg | H04L 67/22 |
| | | | 709/203 |
| 2015/0242206 A1* | 8/2015 | Velusamy | G06F 9/454 |
| | | | 717/121 |
| 2015/0269639 A1* | 9/2015 | Mistriel | G06Q 50/01 |
| | | | 705/319 |
| 2016/0094508 A1* | 3/2016 | Nomura | H04L 67/10 |
| | | | 709/206 |
| 2016/0134582 A1* | 5/2016 | Rubinstein | H04L 63/108 |
| | | | 709/206 |
| 2016/0180113 A1* | 6/2016 | Patton | G06F 16/9535 |
| | | | 726/28 |
| 2016/0182576 A1* | 6/2016 | Kromnick | H04W 4/70 |
| | | | 709/204 |
| 2016/0247535 A1* | 8/2016 | Latulipe | G06F 3/0481 |
| 2016/0323219 A1* | 11/2016 | Brecx | H04L 51/32 |
| 2016/0357352 A1* | 12/2016 | Matas | G06Q 50/01 |
| 2016/0371471 A1* | 12/2016 | Patton | G06F 21/6218 |
| 2017/0139919 A1* | 5/2017 | Ball | G06F 16/24578 |
| 2017/0149714 A1* | 5/2017 | Valdivia | H04L 51/16 |
| 2017/0266531 A1* | 9/2017 | Elford | A63B 24/0062 |
| 2018/0139413 A1* | 5/2018 | Diao | H04L 65/601 |
| 2018/0241871 A1* | 8/2018 | Sarafa | H04M 1/72555 |
| 2019/0166074 A1* | 5/2019 | Voss | H04L 51/10 |

OTHER PUBLICATIONS

Barrett—Facebook Search Now Finds Public Posts So Hide Yours—Wired—Oct. 22, 2015 (Year: 2015).*
Bramble—How to Use Facebook Stories for Marketing—Social Media Examiner—Apr. 3, 2017 (Year: 2017).*
Goel—Flipping the Switches on Facebooks Privacy Controls—The New York Times—Jan. 29, 2014 (Year: 2014).*
How to Unhide Comments on Facebook 12 Steps with Pictures—Wikihow—Mar. 12, 2017 (Year: 2017).*
Llasorna—Does deleting a Facebook posting also delete the comments—Web Application—Jan. 14, 2014 (Year: 2014).*

* cited by examiner

STORYLINES: COLLABORATIVE FEEDBACK SYSTEM

BACKGROUND

Current social media applications allow users all over the world to share their thoughts and ideas on various topics. They also allow users to share media including videos, gifs, images and text with each other. Most current social media applications allow users to create posts that are visible to friends and family, or to the public in general. These posts may contain pictures, videos, text or other media content. Those users that can view the post may have the opportunity to like the post, leave a comment, or otherwise react to the post.

In most cases, however, these interactions with the post occur in an ad hoc manner, with little organization. Users can provide comments, or like other user's comments, but these interactions typically occur line by line in a long string of other user's comments. Thus, many of these interactions or items of feedback do not get back to the original poster, or to the other users who provide feedback.

SUMMARY

As will be described in greater detail below, the instant disclosure describes a system that allows users to share content and react using storyline-based feedback. A user may create a post and specify that the post allows storyline-based feedback. The user may also specify which users are allowed to provide storyline-based feedback, or whether the public in general may provide such feedback. Once the post has been made available online, the specified users may provide storyline-based feedback. This feedback, as will be described in greater detail below, includes ephemeral visual content that is tied to the original post. The original post and the storyline-based feedback may be stored together as a single conversation. When the post and/or the storyline-based feedback expires, the entire conversation may also expire.

In one example, a computer-implemented method for sharing content and allowing users to react using storyline-based feedback may include receiving a first input identifying content is to be part of a story. The method may next include receiving a second input indicating that the story is available to receive storyline-based feedback. The storyline-based feedback may include ephemeral visual content related to the story. Users may join a conversation by adding such visual content. The method may further include posting the story for consumption by other specified users, receiving visual storyline-based feedback related to the posted story from different users, and updating the posted story with the received portions of storyline-based feedback in storyline form.

In some examples, the selected story and subsequent storyline-based feedback may be directed to a limited group of participants. In some examples, the selected story and subsequent storyline-based feedback may be subsequently made public, such that the selected story and subsequent storyline-based feedback may be viewable by public users. In some examples, the selected story and subsequent storyline-based feedback may be directed to a specified topic such as a movie.

In some examples, the selected story and subsequent storyline-based feedback may be directed to a specified event or place. In some examples, the selected story and subsequent storyline-based feedback may be directed to a specified hashtag. In some examples, the selected story and subsequent storyline-based feedback may be stored in a private container, which may allow users to curate content including stories without sharing the content.

In some examples, at least one story initially stored in the private container may be subsequently shared with other selected users or may be shared publicly. Over time, a collection of posts may become a meaningful storyworth sharing. In some examples, the selected story may have a lifetime which is limited to a specific amount of time. In some examples, each portion of storyline-based feedback may be bound to the selected storyline, so that when the lifetime of the selected story expires, the storyline-based feedback expires with the story. In some examples, the selected story and the corresponding storyline-based feedback may be archived together as a single conversation.

In some examples, the method for sharing content and allowing users to react using storyline-based feedback may further include generating and transmitting a notification to various users indicating that the selected story has been posted and is available to receive storyline-based feedback. In some examples, storyline-based feedback may be enabled after the selected story has been posted. In some examples, the method may further include displaying an icon overlaying the selected post, where the displayed icon allows users to add storyline-based feedback to the selected post. In some examples, the icon may only be displayed for a limited subset of users, including those users that are permitted to add storyline-based feedback to the selected post.

In some examples, the method for sharing content and allowing users to react using storyline-based feedback may further include providing a notification to various users indicating that they were tagged in a private storyline. In some examples, non-tagged users may be able to view the selected post, but may not be able to view the corresponding storyline-based feedback. In some examples, the storyline-based feedback may be displayed in a vertical row of cards, where the size of each card may be based on the associated amount of content included in the card.

In addition, a corresponding system for sharing content and allowing users to react using storyline-based feedback may include several modules stored in memory, including a receiving module for receiving a first input identifying content is to be part of a story, and receiving a second input indicating that the story is available to receive storyline-based feedback. The system may further include a posting module for posting the selected story for consumption by other specified users. The receiving module may receive visual storyline-based feedback related to the story from different users, and a presentation module may update the posted story with the received portions of storyline-based feedback in storyline form for presentation to the specified users.

In some examples, the above-described method may be encoded as computer-readable instructions on a computer-readable medium. For example, a computer-readable medium may include one or more computer-executable instructions that, when executed by at least one processor of a computing device, may cause the computing device to receive a first input identifying content is to be part of a story, as well as receive a second input indicating that the story is available to receive storyline-based feedback. The storyline-based feedback may include ephemeral visual content related to the story. Users may join a conversation by adding such visual content. The computing device may further post the story for consumption by other specified users, receive visual storyline-based feedback related to the posted story from different users, and update the posted story with the received portions of storyline-based feedback in storyline form.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
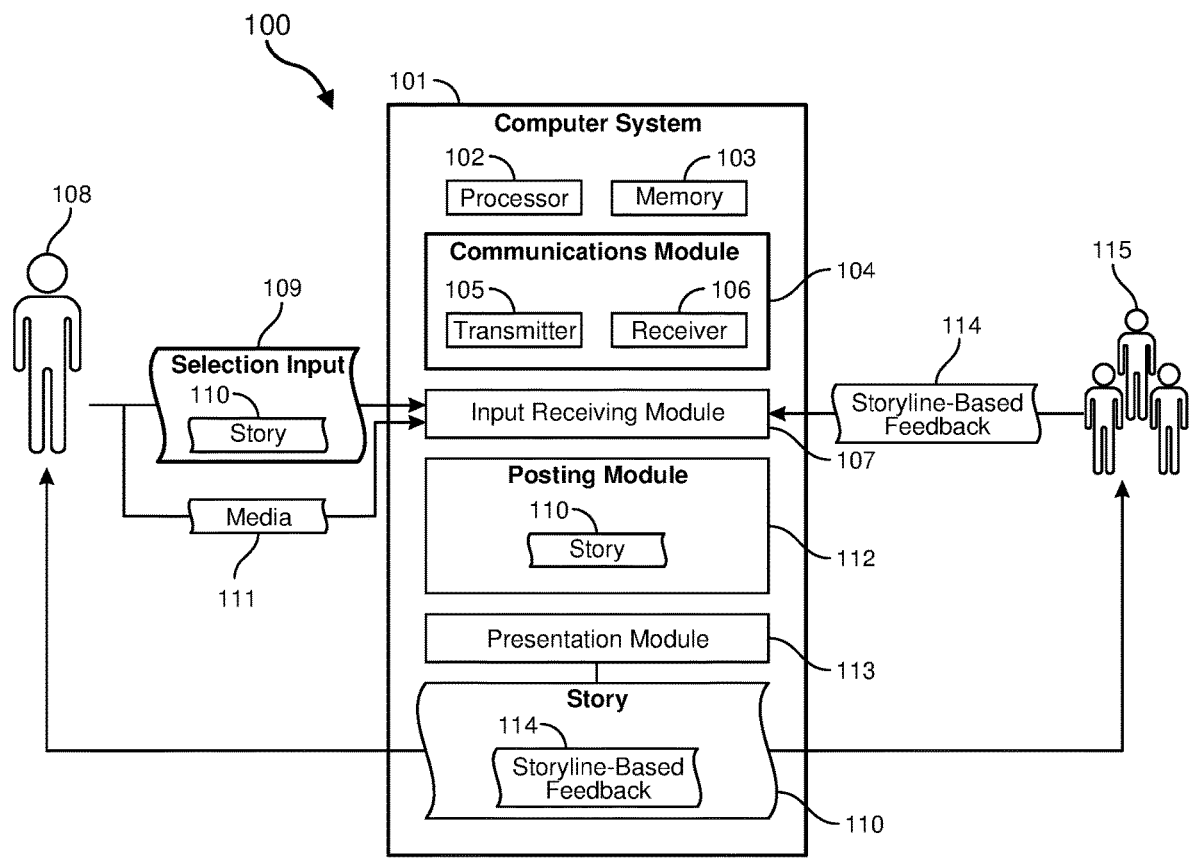
FIG. 1 illustrates a system architecture that allows users to share content and react using storyline-based feedback.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to methods and systems for sharing content and allowing users to react to the shared content using storyline-based feedback. As will be explained in greater detail below, embodiments of the instant disclosure may provide an easier means of sharing content and interacting with that content. In traditional social media applications, users provide comments which appear below the original user's post. These comments may be added at any time, and may appear in any order. Users may, for example, add comments based on other comments. Thus, a given line of comments may have a first comment posted shortly after the original post, followed by multiple comments reacting to the first comments that were generated at a much later point in time. Then, a subsequent comment written much earlier in time, may appear below the reactionary comments. Still further, in traditional systems, the comments are not limited to a given time frame, and are not stored with the original post. Traditional feedback and commenting systems are thus unorganized and difficult to navigate.

Navigating these comments to look for desired comments (e.g., comments from friends or family) is also unwieldy and often fruitless. Long lists of comments may appear after a user's post from many different people. Sifting through these posts to find comments that are relevant and useful, or simply desired by the user, may be tedious and complicated. Navigating such comments and limiting comments to only desired users is a problem unique to social media applications and websites. The embodiments herein enable a user to allow storyline-based feedback fortheir posts, and specify who is allowed to provide such feedback. The storyline feedback may be ephemeral, expiring after a given amount of time, and may be presented to the user in a manner that is much easier to consume and is much more relevant to the user. In this manner, the embodiments herein provide multiple fundamental presentation and user interface improvements to current social media applications and websites.

The following will provide, with reference to FIGS. 1-15, detailed descriptions of how and when user reactions (such as storyline-based feedback) are recorded, and how those reactions are presented to other users. FIG. 1, for example, illustrates a computing architecture 100 in which many of the embodiments described herein may operate. The computing architecture 100 may include a computer system 101. The computer system 101 may include at least one processor 102 and at least some system memory 103. The computer system 101 may be any type of local or distributed computer system, including a cloud computer system. The computer system 101 may include program modules for performing a variety of different functions. The program modules may be hardware-based, software-based, or may include a combination of hardware and software. Each program module may use or represent computing hardware and/or software to perform specified functions, including those described herein below.

For example, communications module 104 may be configured to communicate with other computer systems. The communications module 104 may include any wired or wireless communication means that can receive and/or transmit data to or from other computer systems. These communication means may include radios including, for example, a hardware-based transmitter 105, a hardware-based receiver 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded systems, or other types of computing systems.

The computer system 101 of FIG. 1 may further include other modules including an input receiving module 107. The input receiving module 107 (which may be different than or the same as receiver 106) may receive inputs from user 108. The inputs may include a selection input 109 selecting a given story 110 or post. The story 110 may include substantially any type of content including text, pictures, videos, gifs, links, or other forms of media 111 or other content. The story may include a single post, or a series of two or more posts. The story may be related to an event, place, person, image, a location, a hashtag, or other item. As such, the story 110 may include content related to that item. The posting module 112 may then post that story 110 for other users to see. The other users that are able to view the post 110 may include a specified list of users, or may be posted to the public in general. The original poster may create the stories 110 and keep them private for a time, and then make the stories public or post them to a specific group of people at a later time. When posting, the user 108 may indicate that the story is configured to receive storyline-based feedback, including storyline comments that may themselves be stories.

The presentation module 113 of computer system 101 may post the story 110 to one or more social media applications or websites. Because the user 108 opted in to allow storyline-based feedback, those users 115 that are able to view the post may provide storyline-based feedback. In at least some embodiments, "storyline-based feedback" may refer to comments, stories, video responses, audio responses, image-based responses, text-based responses, or other reactions to the original post. This storyline-based feedback 114 may be grouped with and stored with the original post. The storyline-based feedback 114 may be ephemeral in nature, and may be set to expire (that is, be removed from the social media application or online website) after a certain amount of time. In some cases, after the original post has been posted, and after multiple comments have come in, the original post and its subsequent storyline-based comments may expire together once the last ephemeral storyline comment expires. These concepts will be explained in greater detail below with regard to method 200 of FIG. 2.

Figure 2:
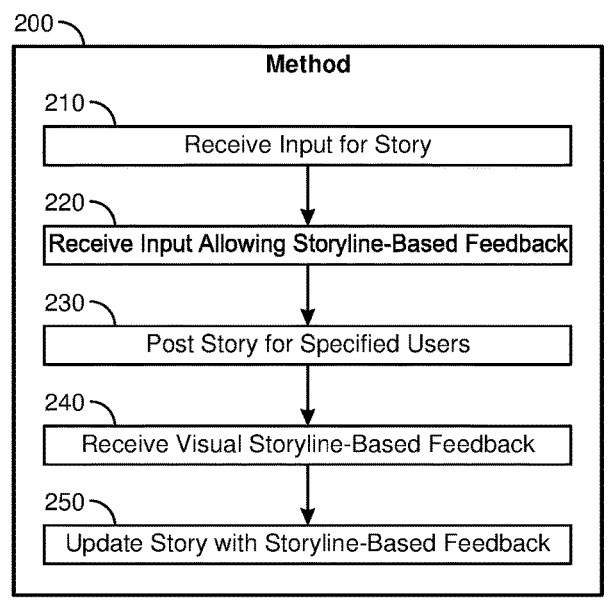
FIG. 2 illustrates a flow diagram of an exemplary method for sharing content and allowing users to react using storyline-based feedback.

FIG. 2 is a flow diagram of an exemplary computer-implemented method 200 for sharing content and allowing users to react using storyline-based feedback. The steps shown in FIG. 2 may be performed by any suitable computer-executable code and/or computing system, including system 100 illustrated in FIG. 1. In one example, each of the steps shown in FIG. 2 may represent an algorithm whose structure includes and/or is represented by multiple substeps, examples of which will be provided in greater detail below.

Figure 3:
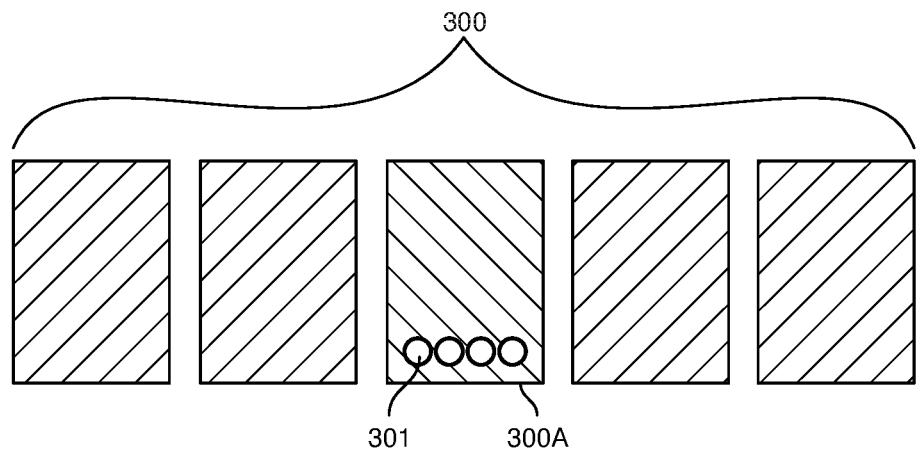
FIG. 3 illustrates an example image of a user interface that allows a user to opt in to a storyline-based feedback model for a story.

As illustrated in FIG. 2, at step 210 one or more of the systems described herein may include receiving a first input indicating that one or more portions of content are to be part of a story. The storyline-based feedback may include ephemeral visual content related to the selected story. Users can join a conversation by adding such visual content. For example, as shown in FIG. 3, a user interface may show multiple stories 300. Each story is represented by a story card (e.g. 300A). The story may include substantially any type of media 111 including videos, pictures, text or audio. The story cards 300 may include indications of users with whom the story was shared. For example, the story represented by story card 300A may have been shared with four (or more) users, each represented by an icon or picture 301. Those with whom the story was shared may respond with their own storyline-based feedback. Each of these stories provided as feedback may be stored with the original story 300A.

Figure 4:
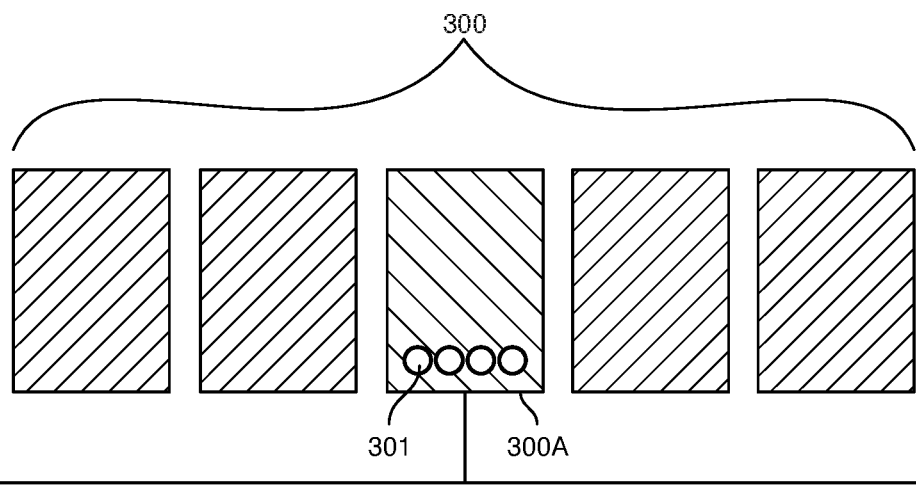
FIG. 4 illustrates an example image of a user interface that allows users to reply with story cards.
Figure 4:
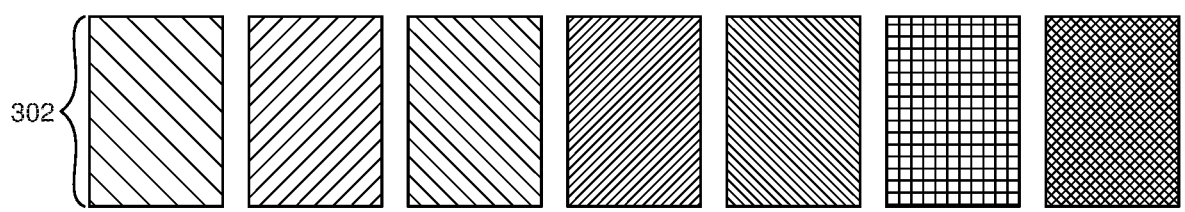

If the original posting user selects a story card, the user can see the storyline-based replies. For example, as shown in FIG. 4, if story card 300A is selected, the user can view storyline-based replies 302. Each of these storyline-based replies may be a story, having its own media content. The storyline-based replies 302 may include some or all of the originally-posted story 300A. For instance, users may add text, stickers, links, emojis or other content items to a picture or video, for example, that was part of the original post represented by story card 300A. The storyline-based replies 302 may be organized based on time of creation, or based on the user that replied, or sorted in some other manner. As such, the original posting user may scroll through multiple different storyline-based replies 302. Other users that were invited to provide storyline-based feedback may also view the storyline-based replies 302.

Figure 5:
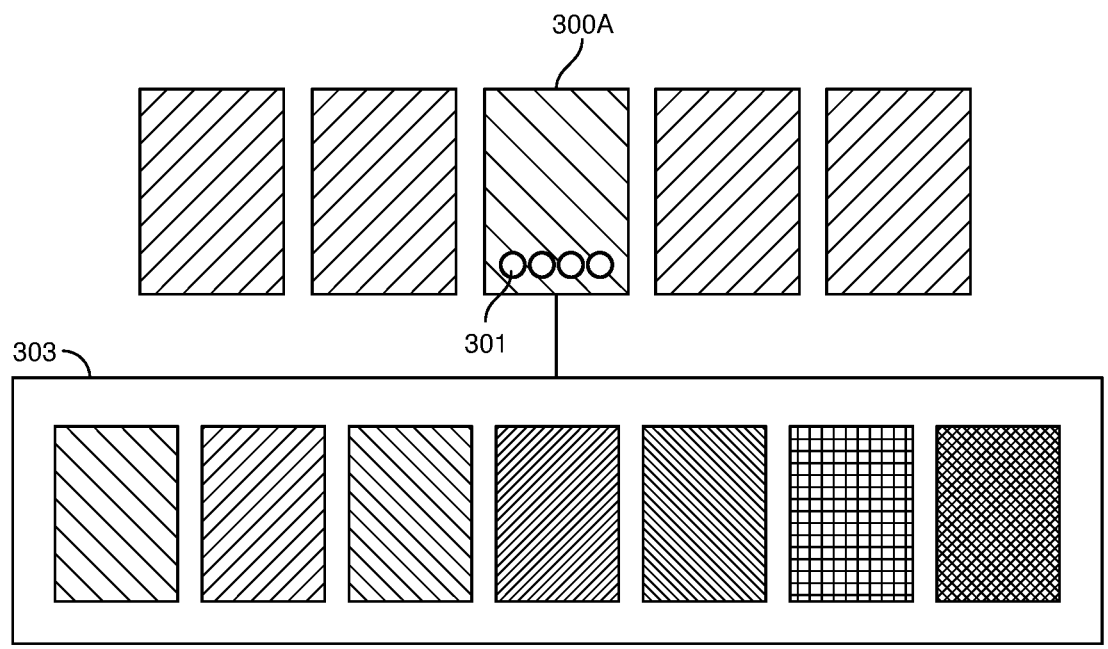
FIG. 5 illustrates an example image of a user interface including a stack of replies in a storyline.
Figure 6:
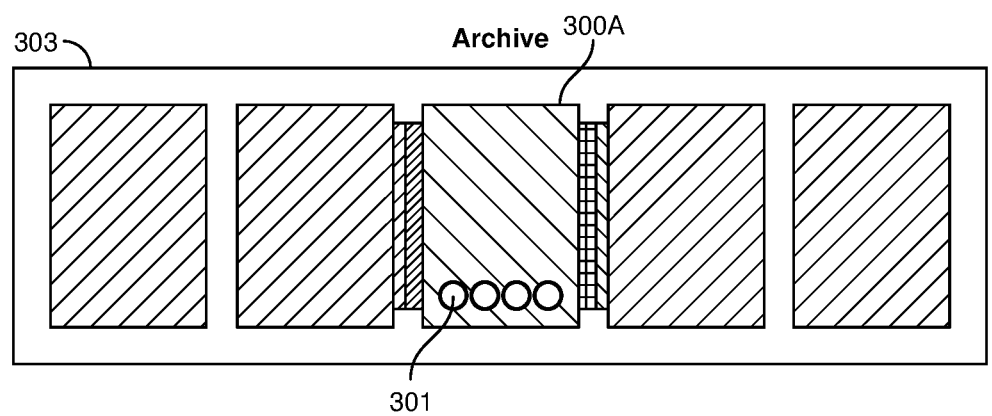
FIG. 6 illustrates an example image of a user interface in which multiple stories are archived in a storyline.

In some embodiments, as shown in FIG. 5, the storyline-based replies 302 may be stored together as a single unit or single data structure. For example, the storyline-based replies 302 may be stored in data structure 303. This data structure 303 may include the original story (300A) and some or all of the corresponding storyline-based replies 302. This data structure 303 may be archived in a local or remote data store. Indeed, as shown in FIG. 6, multiple stories may be stored in an archive, where each story is stored in conjunction with its storyline-based feedback. Each storyline-based reply 302 may be accessed from the archive individually, or as a series of connected stories, connected to the original post (represented by story card 300A).

The method 200 of FIG. 2 may further include receiving a second input indicating that the story is available to receive storyline-based feedback (step 220). The storyline-based feedback 114 may include ephemeral visual content related to the story 110. Method 200 may next include posting the selected story in response to another input indicating that various portions of content are to be part of the selected story (step 230). For example, user 108 of FIG. 1 may provide input 109 indicating that story 110 is to be posted for viewing by one or more people (e.g., 115). The input receiving module 107 may receive this input 109 and may post the story 110. The posted story 110 may then be available to the one or more specified persons (e.g., friends or family members), or to the public in general. The original poster 108 may further provide input indicating that the posted story 110 is open to receive storyline-based feedback 114 from the specified persons or from the public.

Still further, the method 200 may include receiving one or more portions of visual storyline-based feedback related to the posted story from at least one of the users (step 240), and updating the posted story with the one or more received portions of storyline-based feedback in storyline form (step 250) for presentation to the specified users. The group of users 115 of FIG. 1 may provide storyline-based feedback 114, which is received by the input receiving module 107 of computer system 101. The presentation module 113 may then present these stories (which make up the storyline-based feedback 114) in conjunction with the original story 110.

Figure 7:
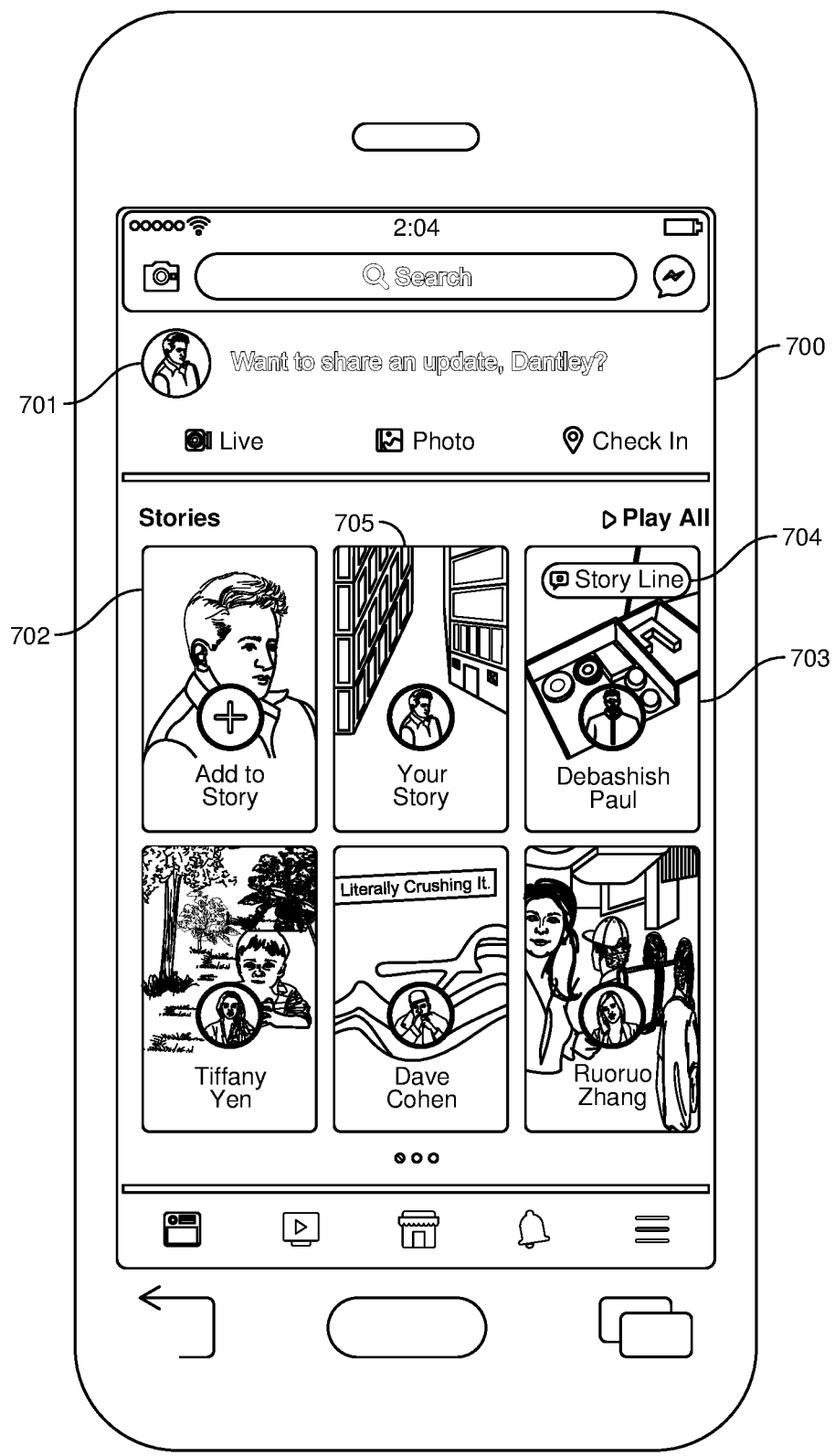
FIG. 7 illustrates an example image of a user interface in which a specific graphic is shown when storyline-based feedback is enabled for a post.

For example, as shown in FIG. 7, when a user enables storyline-based feedback, an icon may appear above that user. In FIG. 7, for example, a user (e.g., 701) may be presented with a user interface 700 that shows multiple stories including their own story 705, as well as those of other users (e.g., the story of user 703). The user 701 may be able to add to his own story using interactive UI element 702, or may be able to view any of the other stories simply by tapping on their corresponding UI elements or otherwise selecting them. As can be seen from UI element 704, user 703's story has an associated storyline. Selecting this element may allow user 701 to view and/or add storyline-based feedback to user 703's story.

Figure 8:
FIG. 8 illustrates an example image of a user interface in which a specific icon is shown when storyline-based feedback is enabled for a post.

When the user selects the interactive UI element 704, a new user interface may be displayed, such as UI 800 of FIG. 8. UI 800 shows an icon 703 representing the selected user. UI 800 also shows various icons or buttons in the bottom left corner including a button 801 that, when selected, allows the user to add storyline-based feedback to user 703's post. Other icons may show users that have already provided storyline-based feedback to user 703's post. The user 701 can click on these buttons (e.g., 802) to view those user's stories. The icon 803 may indicate that additional users have added storyline-based feedback to user 703's post. In FIG. 8, icon 803 indicates that eight other people have added storyline-based feedback to the original post. Thus, a user may quickly observe how many people have commented on or provided feedback to the original user's post. The feedback is storyline-based, and is easy to access and view. As such, users need not sift through long lists of comments and replies to comments. Rather, each storyline reply is displayed in an intuitive manner, allowing easier interaction, easier collaboration, and an easier way to leave feedback to a user's post.

Figure 9:
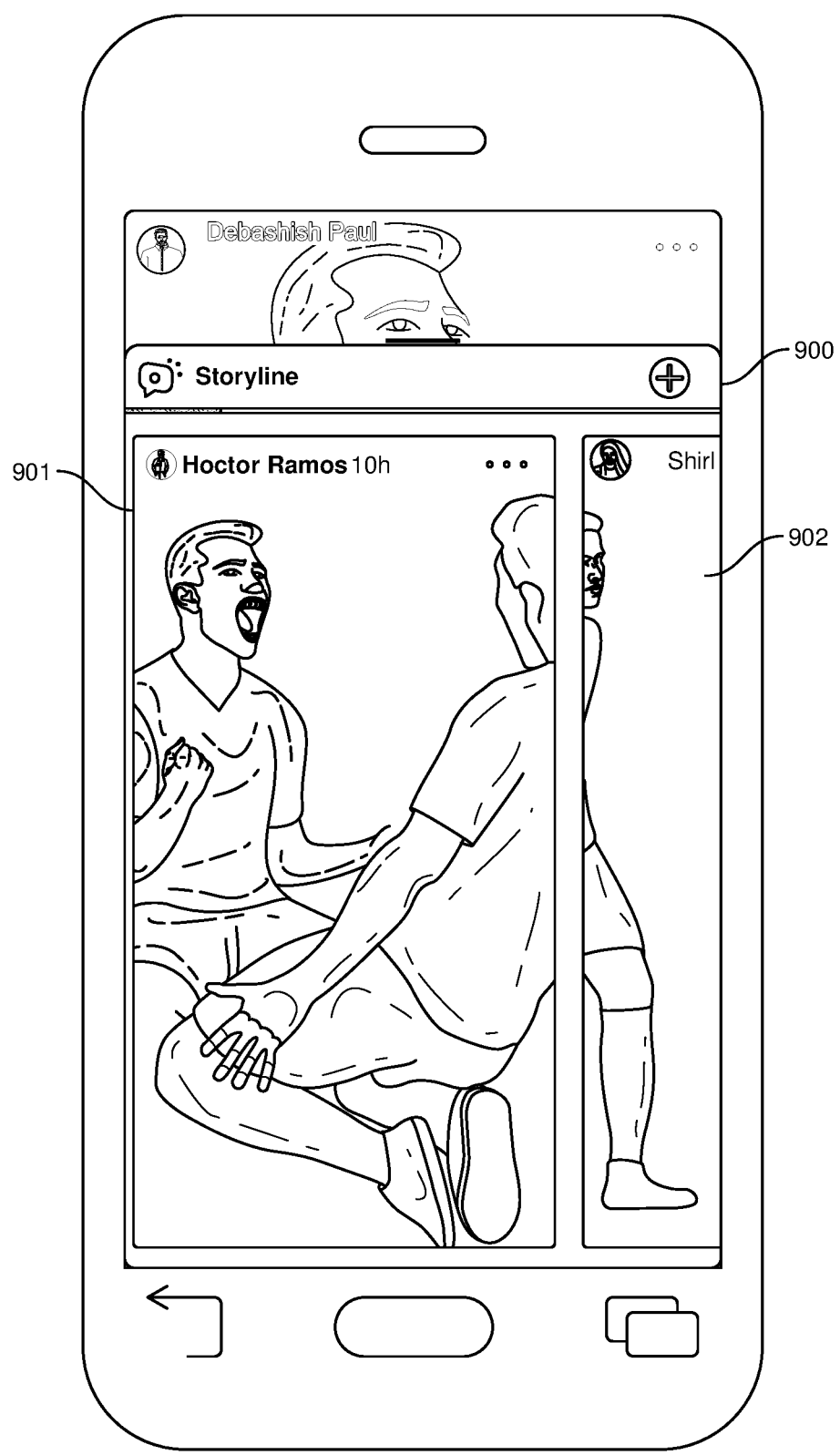
FIG. 9 illustrates an example image of a user interface in which a storyline is shown within a story.
Figure 10:
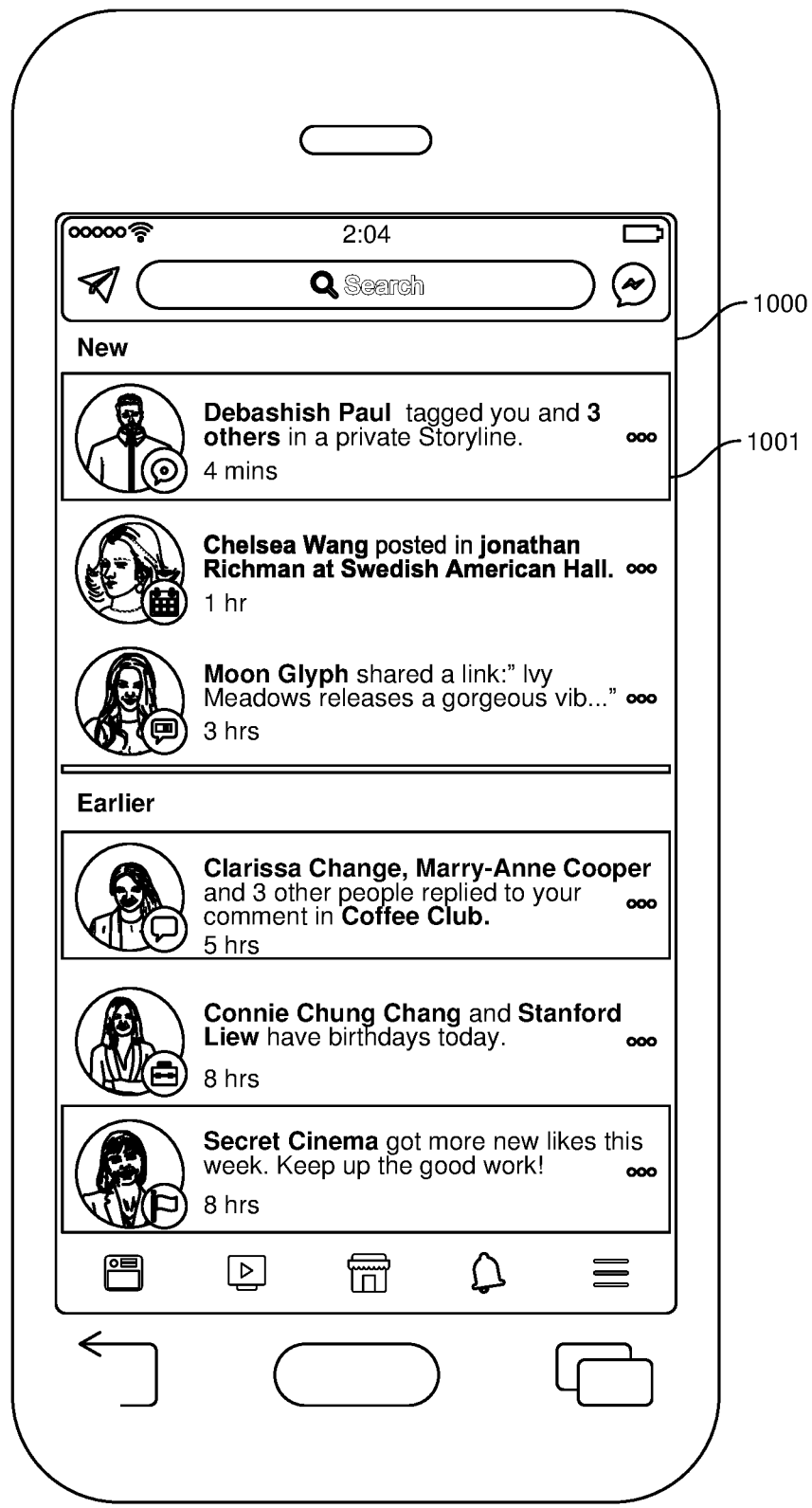
FIG. 10 illustrates an example image of a user interface in which a user is notified that a post allowing storyline-based feedback has been shared.
Figure 11:
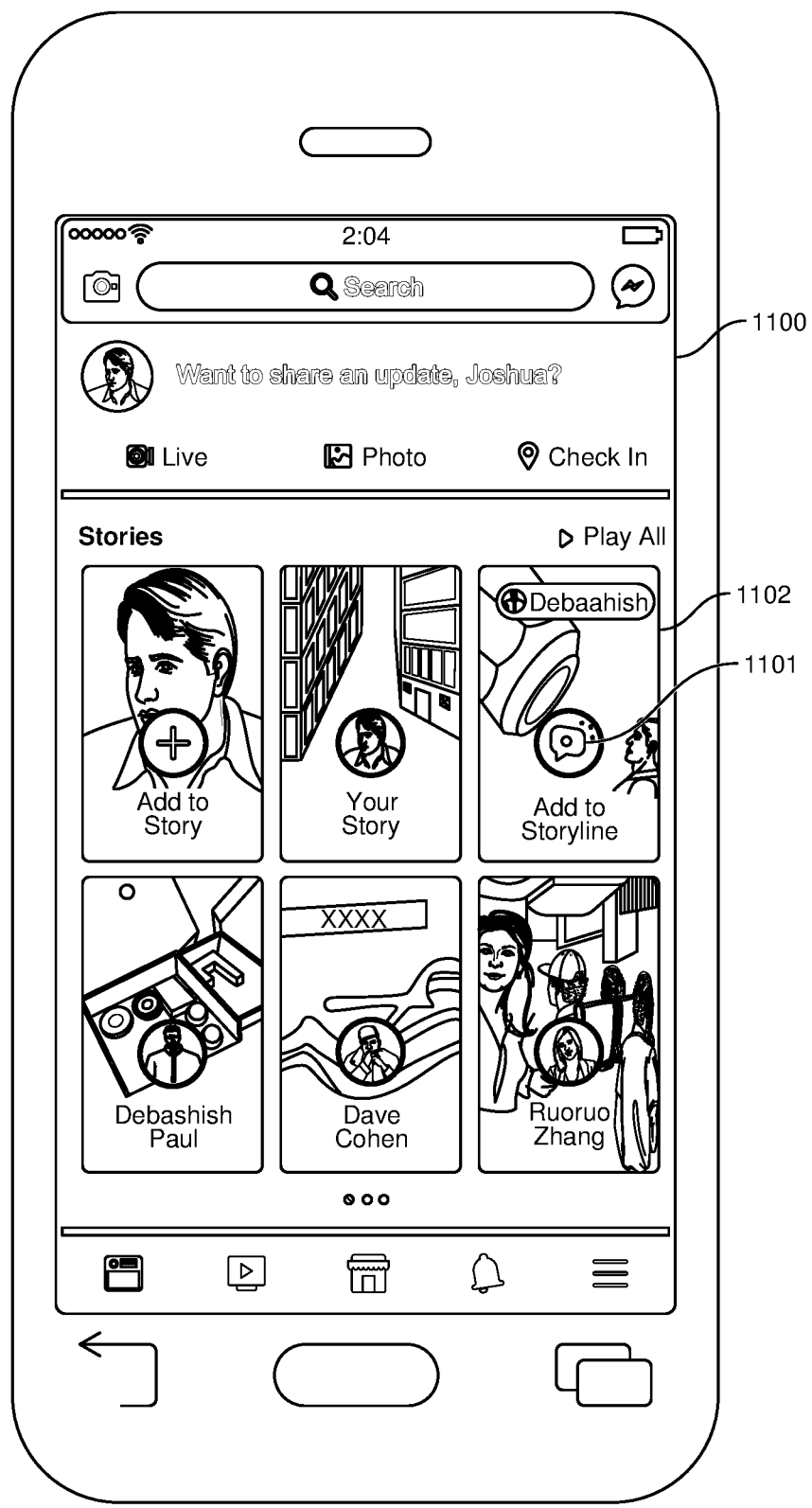
FIG. 11 illustrates an example image of a user interface in which a specific icon is shown allowing a user to add to another user's story.

FIG. 9 illustrates a subsequent user interface 900 that may be shown if a user selects a user (e.g., 802) from the interface 800 of FIG. 8. The user interface 900 of FIG. 9 may illustrate story cards (e.g., 901 and 902) belonging to the users that have provided storyline-based feedback. Each story card may show an image, video, text, and/or audio that have been posted by the respective users in response to the original user's post that was opened up to storyline-based feedback. Users can swipe left to view different stories, starting with story 901, and swiping to story 902, and so on.

When a user is invited to provide storyline-based feedback for a given story, the user may receive a notification on their electronic device. For example, as shown in interface 1000 of FIG. 10, the original poster (e.g., user 701 of FIG. 7) may receive a notification 1001 indicating that another user (e.g., user 703 of FIG. 7) has tagged user 701, indicating that user 701 can provide storyline-based feedback to user 703's story. The user can then select the notification (1001), or an element of the notification, and view user 703's post, along with any storyline-based feedback provided by other users. In some embodiments, if the user selects the notification, they may be brought to an interface 1100 that allows the user to add to the posting user's storyline. For instance, the posting user's story card 1102 may include a UI element 1101 which, when selected, allows the user to add a story as feedback to the posting user's story.

Figure 12:
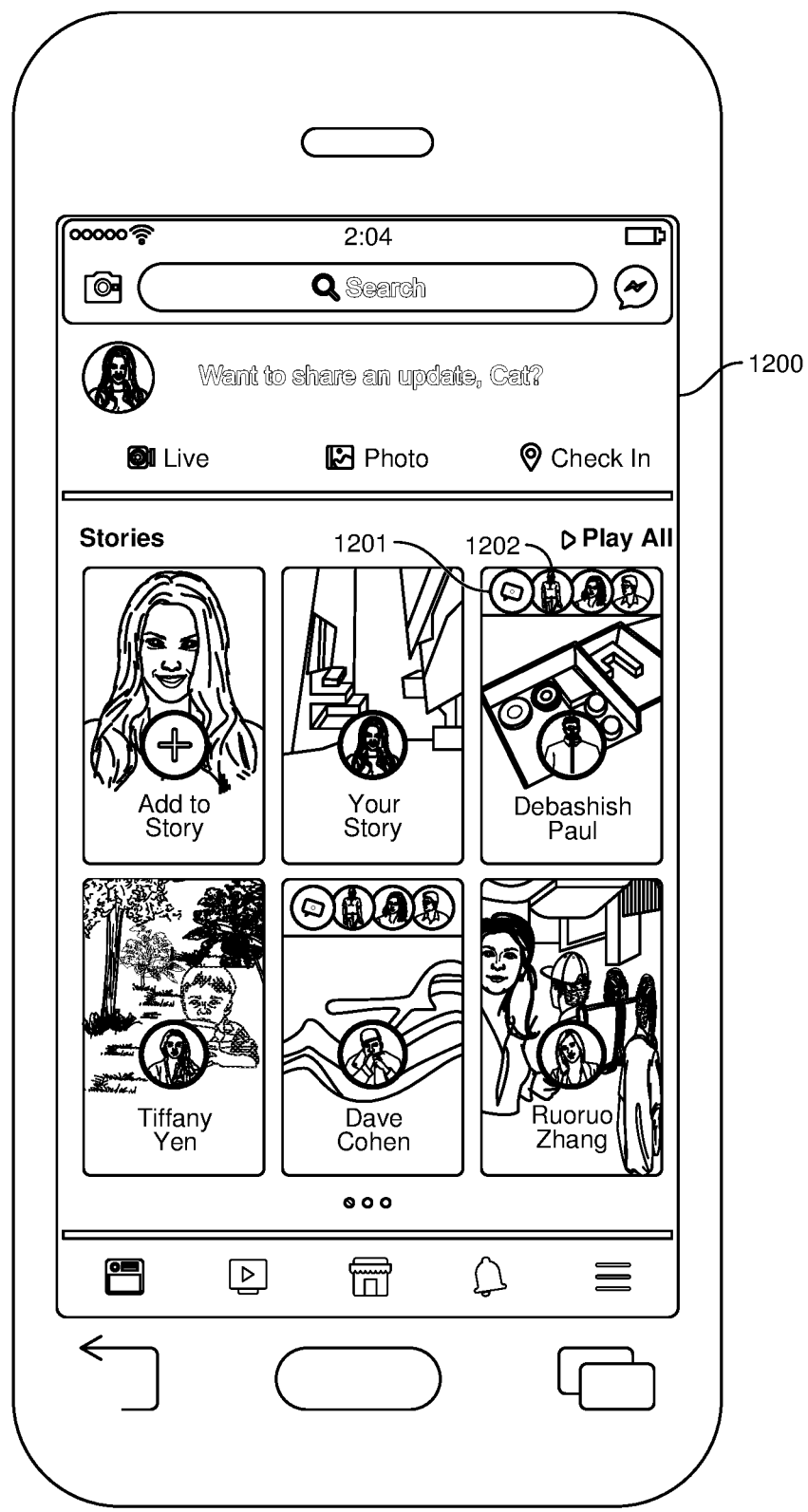
FIG. 12 illustrates an example image of a user interface that allows users to discover other users' stories.

In an alternate user interface 1200 of FIG. 12, icons, buttons or other interactive user interface elements may allow a user to directly interact with the original poster's story without first navigating to that story. For example, while in FIG. 8, a user could add storyline-based feedback using button 801, or could view a user's storyline-based feedback using button 802 from the user interface showing the user's actual post, in FIG. 12, the user can select button 1201 to directly add storyline-based feedback to the user's story, and can select button 1202 to directly view other user's storyline-based feedback. Thus, an even more direct mechanism may be provided that allows users to view and provide storyline-based feedback to a user's original post.

Figure 13:
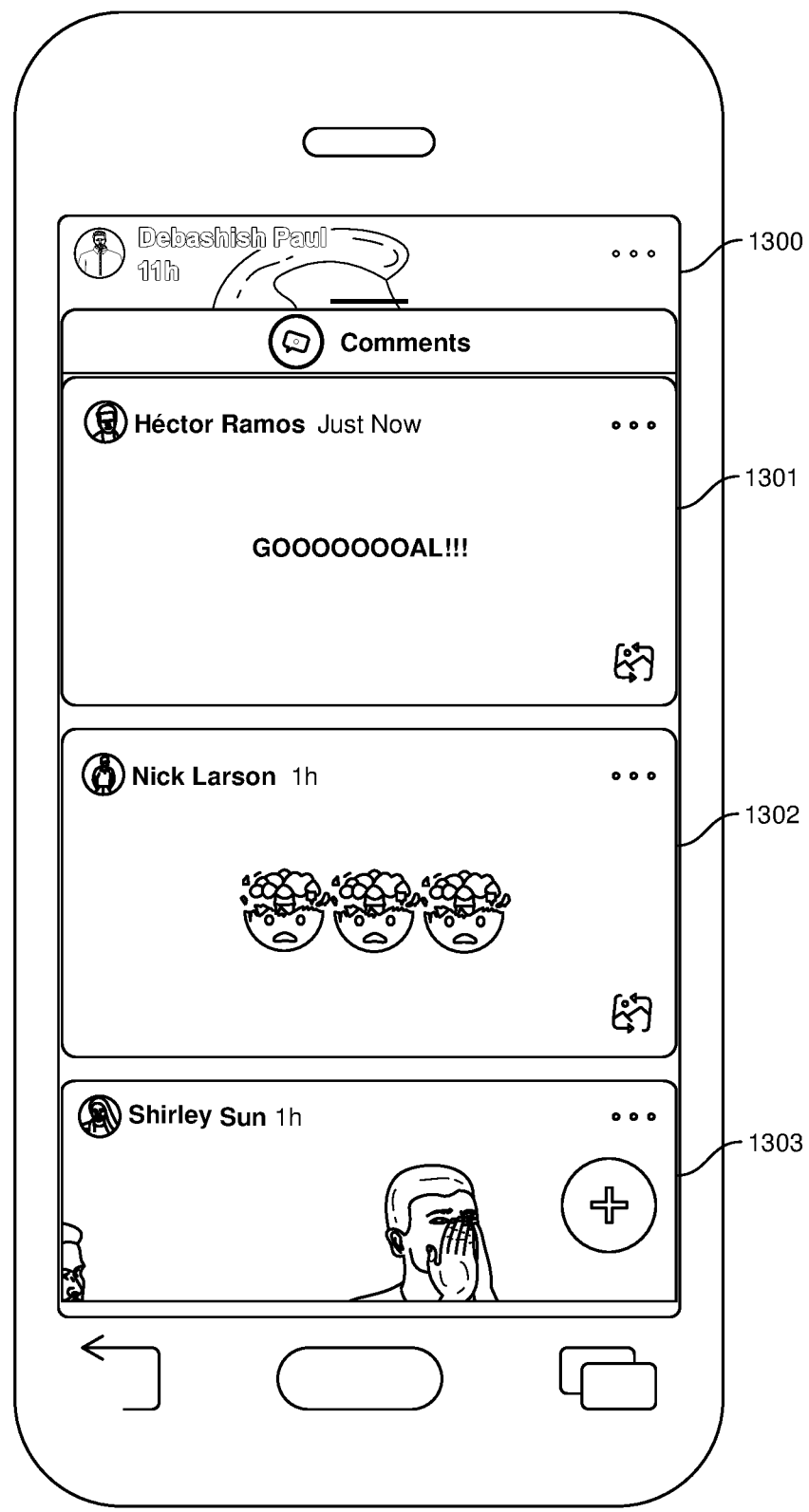
FIG. 13 illustrates an example image of a user interface that displays storyline-based feedback in the form of vertical cards.
Figure 14:
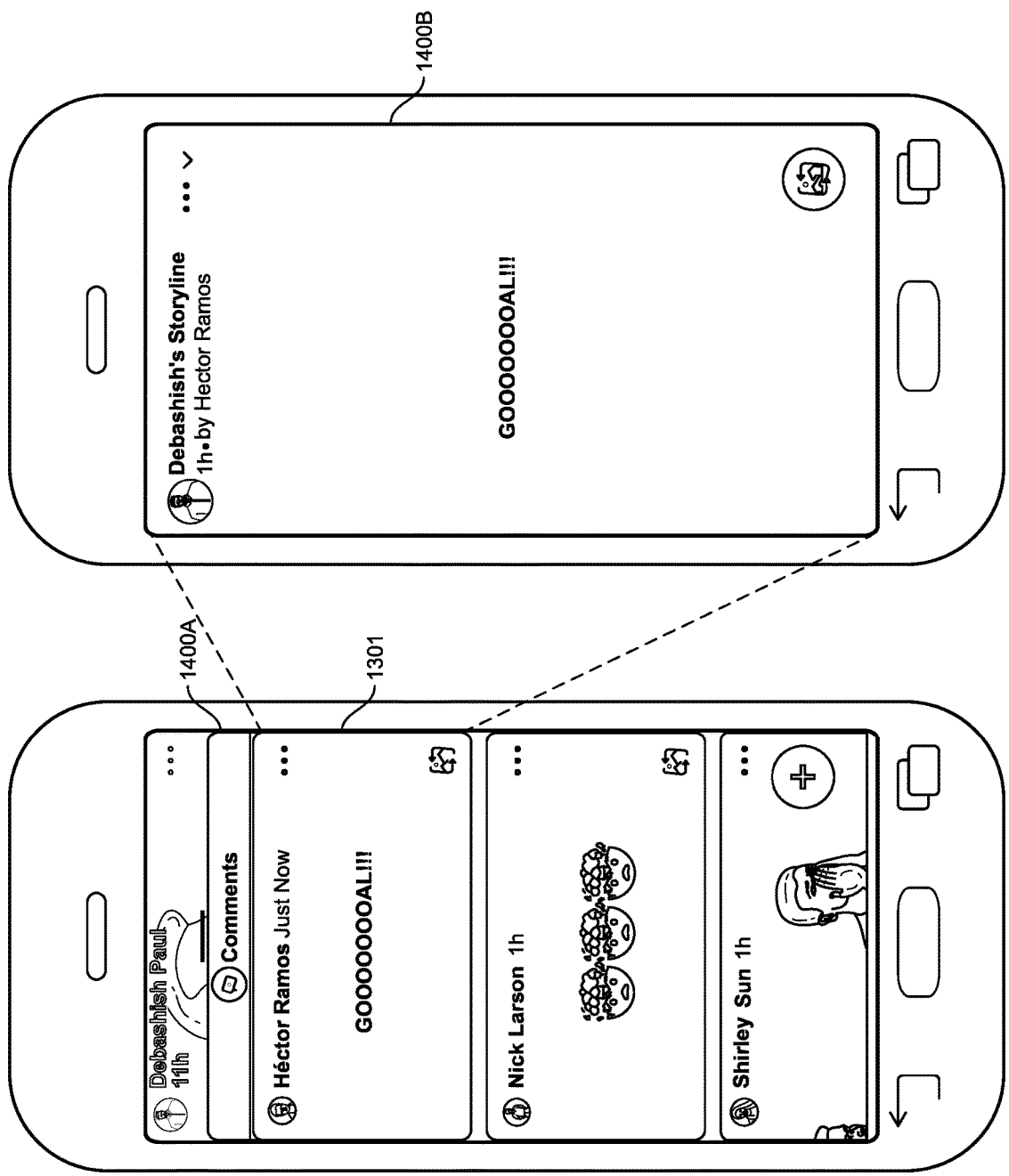
FIG. 14 illustrates an example image of a user interface in which a full-screen view is shown upon selecting a vertical card.
Figure 15:
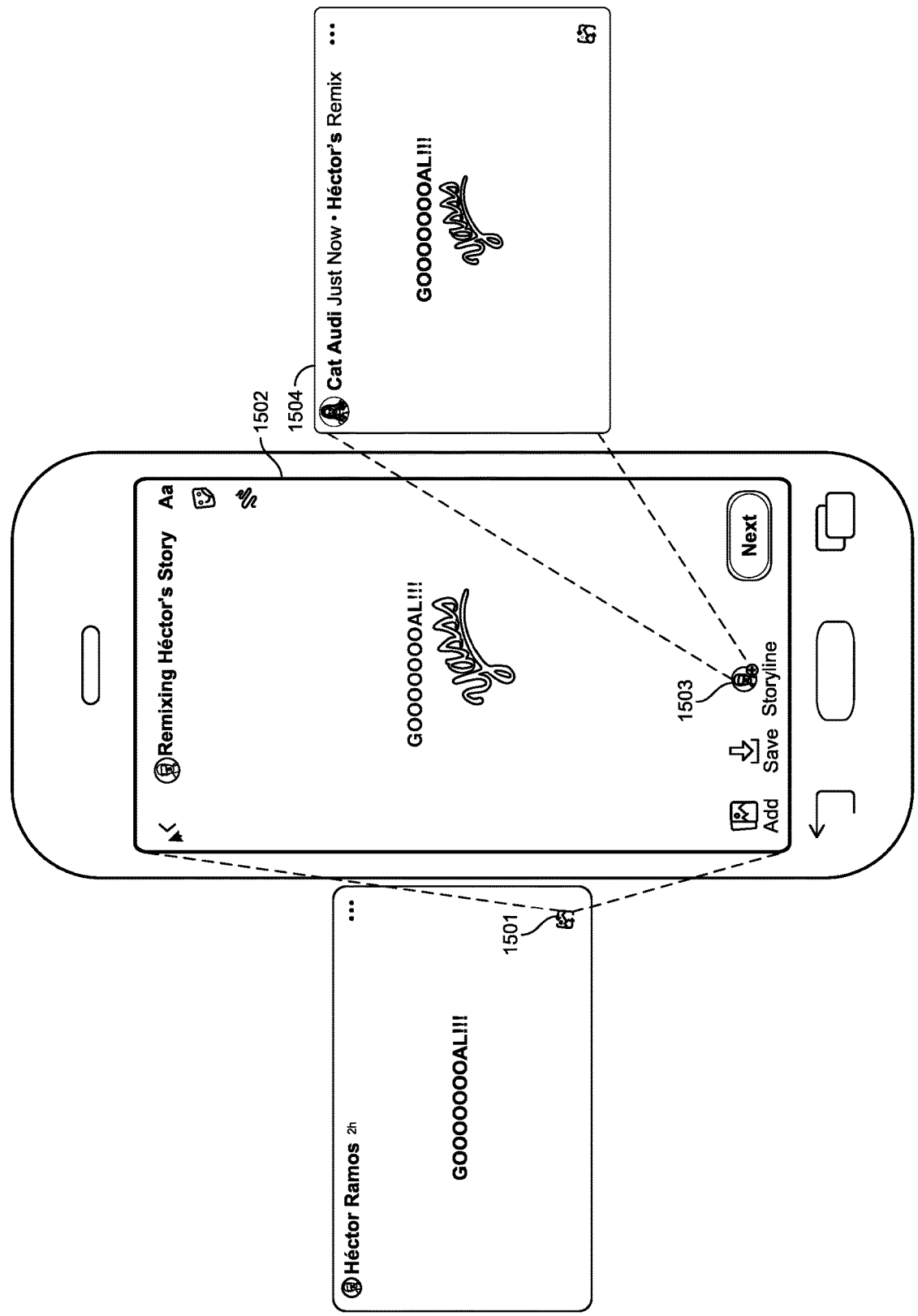
FIG. 15 illustrates an example image of a user interface that allows a user to remix a storyline comment.

FIG. 13 illustrates a user interface 1300 with multiple different story cards 1301, 1302 and 1303. These comment cards may be substantially any size or shape. In some embodiments, the comment cards (e.g., 1301-1303) in UI 1300 may be of the same width, but may differ in length depending on the content of the comment card. Cards with more content may be longer in length than comment cards with less content. Selecting a given comment card (e.g., 1301) may result in a new full-screen view of that card. For instance, as shown in FIG. 14, if a user selects comment card 1301 in UI 1400A, a full-screen image may be shown in UI 1400B. Moreover, as shown in FIG. 15, comment cards may include icons or buttons that allow other steps to be performed. For instance, a user can select button 1501 to show a full-screen display of that comment card. Then, options on that full-screen card 1502 may include a storyline button that allows users to add to the storyline in a separate comment card window 1504.

As noted previously, whenever a story is selected by a user to receive storyline-based feedback, any subsequently received storyline-based feedback may be directed to a limited group of participants. In other cases, the selected story and subsequent storyline-based feedback may be subsequently made public. As such, the selected story and subsequent storyline-based feedback would be viewable by public users. In some cases, the story may be posted and stored just for the original user, and may be opened to other users at a later time. Regardless of who can ultimately see the story and its associated feedback, each story may be directed to a specified topic, perhaps designated by the original poster.

For example, the original poster may select a topic such as a movie. Then, any subsequent storyline-based feedback may be directed to that movie. Similarly, the original poster may select an event, a place, or other designated subject to which the storyline-based feedback is to be directed. Thus, for instance, if a user wanted to post travel pictures taken on a trip to Paris, the user could select Paris, France as the topic, and other users could respond with stories related to their experiences in or with Paris. Still further, the story and subsequent storyline-based feedback may be directed to a specific hashtag. Then, any storyline-based feedback would be directed to that hashtag specified by the original poster.

In some embodiments, users may not wish to immediately share their content with other users. For example, a user may post a story privately in his or her own private storage. This allows the user to create and curate content, including stories, without sharing that content. Over time, a collection of posts may become a meaningful story worth sharing. The user may add their own feedback to a private post, or may open up the post to one or more specific users. These specified users would then be able to see the user's previously private post and subsequent stories. In this manner, a user has full control over when a story is made available to others, and when storyline-based feedback is available to others.

Moreover, the user can share the post and have the post be public, or open to a subset of people, but then enable storyline-based feedback for only certain individuals. Thus, a user could create a post and publish it publicly where it would look like a normal post. Unbeknownst to the public, however, the user may open the public post to storyline-based feedback, but only certain specified users will be able to provide that storyline-based feedback. Thus, for example, the storyline icon 704 of FIG. 7 would only appear if the user was one who was invited to leave storyline-based feedback. Similarly, the original poster may publish a post to a set of 10 users, for example, but then only make storyline-based feedback available to a subset of five users. In this example, the five non-invited users of the set of 10 would see a normal post, and the five users invited to provide storyline-based feedback would see a post that allows storyline-based feedback (e.g., they would see storyline icon 704).

In some embodiments, a story may have a lifetime which is limited to a specific amount of time. The story (and associated storyline-based feedback) may, for example, be automatically removed from social media applications and/or websites on a given date and/or at a given time. Once removed, the story may be archived in a private data store, or may be automatically deleted. These actions may be performed according to policy or settings established by the original poster. In some cases, each piece of storyline-based feedback (e.g., each storyline reply) may be bound to the original post or story. As such, when the lifetime of the story expires, the storyline-based feedback associated with that story expires with the story. In cases where the story and storyline-based feedback are to be archived, the story and corresponding storyline-based feedback may be archived together as a single conversation, as shown in FIG. 6.

In some embodiments, the method for sharing content and allowing users to react using storyline-based feedback may also include generating and transmitting a notification to users indicating that the user's story has been posted and is available to receive storyline-based feedback. These notifications may appear within an application (e.g., a social media application), in a notifications tab in the user's device, or on a social media webpage. The notifications indicate to the user that a story has been posted, and that the story is open to receiving storyline-based feedback. This notification may come immediately after a user has published a post, or may come at a later time. Indeed, storyline-based feedback may be enabled after the original story has been posted. The original poster may, for example, decide at some point after posting their story that they want to open the story up to storyline-based feedback. In such cases, the user will enable storyline-based feedback for certain users, and those users will receive notifications indicating that they can provide storyline-based feedback. When the user views that story, they may see an icon overlaying the post. That icon (e.g., 704) allows users to add storyline-based feedback to the post. That icon may only be displayed for a limited subset of users, including those users that are permitted to add storyline-based feedback to the selected post.

In addition, a corresponding system for sharing content and allowing users to react using storyline-based feedback may include several modules stored in memory, including a including a receiving module (e.g., 107 of FIG. 1) for receiving a first input identifying content is to be part of a story, and receiving a second input indicating that the story is available to receive storyline-based feedback. The system may further include a posting module 112 for posting the selected story for consumption by other specified users. The receiving module 107 may receive visual storyline-based feedback related to the story from different users, and a presentation module 113 may update the posted story with the received portions of storyline-based feedback in storyline form for presentation to the specified users.

In some examples, the above-described method may be encoded as computer-readable instructions on a computer-readable medium. For example, a computer-readable medium may include one or more computer-executable instructions that, when executed by at least one processor of a computing device, may cause the computing device to receive a first input identifying content is to be part of a story, as well as receive a second input indicating that the story is available to receive storyline-based feedback. The storyline-based feedback may include ephemeral visual content related to the story. Users may join a conversation by adding such visual content. The computing device may further post the story for consumption by other specified users, receive visual storyline-based feedback related to the posted story from different users, and update the posted story with the received portions of storyline-based feedback in storyline form.

Accordingly, methods, systems and computer-readable instructions may be provided for sharing content and allowing users to react using storyline-based feedback. Users may create a post and specify certain users who are allowed to view that post and may specify which users are allowed to provide storyline-based feedback. In this manner, the original poster has full control of who can comment on their post. The user can also control how long the post is available, and how long storyline-based feedback is available. After the expiration time, the post (and its associated storyline-based feedback) will either be archived or deleted.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

I claim:

1. A computer-implemented method comprising:
   receiving a first input indicating that one or more portions of content are to be part of a story;
   receiving a second input indicating that the story is available to receive storyline-based feedback, the storyline-based feedback comprising ephemeral visual content related to the story;
   posting the story for consumption by one or more specified users, wherein the posted story includes an indicator that is visible by the one or more specified users, but is not visible to non-specified users that view the posted story, the indicator providing a visual indication displayed on the posted story that storyline-based feedback is available for the posted story, wherein a preview of the posted story is configured to present an interactive user interface element that allows a user to directly provide feedback to the posted story without first navigating to the posted story;
   receiving one or more portions of visual storyline-based feedback related to the posted story from at least one of the users; and
   updating the posted story with the one or more received portions of storyline-based feedback in storyline form, wherein the storyline-based feedback is presented on one or more story cards that are overlaid on the posted story.

2. The computer-implemented method of claim 1, wherein the posted story and subsequent storyline-based feedback are directed to a limited group of participants.

3. The computer-implemented method of claim 2, wherein the posted story and subsequent storyline-based feedback are subsequently made public, such that the posted story and subsequent storyline-based feedback are viewable by public users.

4. The computer-implemented method of claim 1, wherein the posted story and subsequent storyline-based feedback are directed to a specified topic.

5. The computer-implemented method of claim 1, wherein the posted story and subsequent storyline-based feedback are directed to a specified event or place.

6. The computer-implemented method of claim 1, wherein the posted story and subsequent storyline-based feedback are directed to a specified hashtag.

7. The computer-implemented method of claim 1, wherein the posted story and subsequent storyline-based feedback are stored in a private container, allowing users to curate content including stories without sharing the content.

8. The computer-implemented method of claim 7, wherein at least one story initially stored in the private container is subsequently shared with one or more selected users or is shared publicly.

9. The computer-implemented method of claim 1, wherein the posted story has a lifetime which is limited to a specific amount of time.

10. The computer-implemented method of claim 9, wherein each portion of storyline-based feedback is bound to the posted story, such that when the lifetime of the posted story expires, the storyline-based feedback expires with the story.

11. The computer-implemented method of claim 9, wherein the posted story and the corresponding storyline-based feedback are archived together as a single conversation.

12. A system comprising:
   at least one physical processor;
   physical memory comprising computer-executable instructions that, when executed by the physical processor, cause the physical processor to:

receive a first input indicating that one or more portions of content are to be part of a story;

receive a second input indicating that the story is available to receive storyline-based feedback, the storyline-based feedback comprising ephemeral visual content related to the story;

post the story for consumption by one or more specified users, wherein the posted story includes an indicator that is visible by the one or more specified users, but is not visible to non-specified users that view the posted story, the indicator providing a visual indication displayed on the posted story that storyline-based feedback is available for the posted story, wherein a preview of the posted story is configured to present an interactive user interface element that allows a user to directly provide feedback to the posted story without first navigating to the posted story;

receive one or more portions of visual storyline-based feedback related to the posted story from at least one of the users; and update the posted story with the one or more received portions of storyline-based feedback in storyline form, wherein the storyline-based feedback is presented on one or more story cards that are overlaid on the posted story.

13. The system of claim 12, further comprising generating and transmitting a notification to one or more specified users indicating that the posted story has been posted and is available to receive storyline-based feedback.

14. The system of claim 12, wherein storyline-based feedback is enabled after the posted story has been posted.

15. The system of claim 12, further comprising displaying an icon overlaying the posted story, the displayed icon allowing users to add storyline-based feedback to the posted story.

16. The system of claim 15, wherein the icon is only displayed for a limited subset of users, including those users that are permitted to add storyline-based feedback to the posted story.

17. The system of claim 12, further comprising providing a notification to one or more users indicating that they were tagged in a private storyline.

18. The system of claim 17, wherein non-tagged users are able to view the posted story, but are not able to view the corresponding storyline-based feedback.

19. The system of claim 12, wherein the storyline-based feedback is displayed in a vertical row of one or more cards, the size of each card being based on the associated amount of content included in the card.

20. A non-transitory computer-readable medium comprising one or more computer-executable instructions that, when executed by at least one processor of a computing device, cause the computing device to generate a user interface that performs the following functions:

receiving a first input indicating that one or more portions of content are to be part of a story;

receiving a second input indicating that the story is available to receive storyline-based feedback, the storyline-based feedback comprising ephemeral visual content related to the story;

posting the story for consumption by one or more specified users, wherein the posted story includes an indicator that is visible by the one or more specified users, but is not visible to non-specified users that view the posted story, the indicator providing a visual indication displayed on the posted story that storyline-based feedback is available for the posted story, wherein a preview of the posted story is configured to present an interactive user interface element that allows a user to directly provide feedback to the posted story without first navigating to the posted story;

receiving one or more portions of visual storyline-based feedback related to the posted story from at least one of the users; and updating the posted story with the one or more received portions of storyline-based feedback in storyline form, wherein the storyline-based feedback is presented on one or more story cards that are overlaid on the posted story.

\* \* \* \* \*